US005656796A

United States Patent [19]

Marinos et al.

[11] Patent Number: 5,656,796

[45] Date of Patent: Aug. 12, 1997

[54] HIGH ENERGY FLEXIBLE COAXIAL CABLE AND CONNECTIONS

[75] Inventors: Charalampos Marinos, Minneapolis; Thomas M. Pfenning, Little Canada; Gary R. Sarff, Minneapolis, all of Minn.

[73] Assignee: FMC Corp., Chicago, Ill.

[21] Appl. No.: 51,909

[22] Filed: Apr. 26, 1993

[51] Int. Cl.$^6$ .............................. H02G 15/02; H01B 7/00

[52] U.S. Cl. .............................. 174/74 R; 174/102 R; 174/110 R; 174/110 AR; 174/120 R; 174/120 AR; 174/122 R

[58] Field of Search .............................. 174/74 R, 74 A, 174/120 SC, 110 R, 110 AR, 98, 102 R, 79, 73.1, 99 R, 110 SR, 120 R, 120 AR, 122 R, 122 G; 156/48, 51; 439/422

[56] References Cited

U.S. PATENT DOCUMENTS

| | | | |
|---|---|---|---|
| 5,151,143 | 9/1992 | Downie | 174/241 X |
| 5,264,660 | 11/1993 | Dunz | 174/28 |

*Primary Examiner*—Bot L. Ledynh

[57] ABSTRACT

A high energy coaxial cable is disclosed which is flexible to the extent of allowing a bend radius as short as 11 ½ inches. The cable will conduct up to 500 kiloamperes and is reinforced to resist the high magnetic forces within the cable caused by the high current conducted. The cable is therefore useful in coupling high current between parts which experience relative movement such as a stationary power supply and a recoiling gun breech.

5 Claims, 1 Drawing Sheet

HIGH ENERGY FLEXIBLE COAXIAL CABLE AND CONNECTIONS

SUMMARY OF THE INVENTION

This invention relates to a flexible high energy coaxial cable for conducting an electric current in the range of 1 to 500 kiloamperes, wherein a high voltage conductor is surrounded by high voltage insulation. A first braided wire tube is positioned to surround the insulation and a first flexible reinforcing layer is positioned to surround the first braided wire tube. A second braided wire tube surrounds the first reinforcing layer and a second flexible reinforcible layer surrounds the second braided wire tube. An outer flexible insulation layer surrounds the second flexible reinforcing layer and the cable has a first end connector at one end in electrical contact with the high voltage conductor and a second end connector at the opposite end in electrical contact with the high voltage conductor.

In another aspect of the invention, the high energy coaxial cable has a minimum bend radius of substantially 11 ½ inches and includes a high voltage center conductor for conducting current up to 500 kiloamperes. A layer of high voltage insulation surrounds the center conductor and a first braided wire tube surrounds the insulation. A first reinforcing wrap surrounds the first braided wire tube and the second braided wire tube surrounds the first reinforcing wrap. The first and second braided wire tubes are in electric contact with each other at the ends thereof. A second reinforcing wrap is placed surrounding the second braided wire tube and first and second end connectors are attached to opposing ends of the high voltage center conductor. First and second return connectors are isolated from the first and second end connectors and surround the high voltage insulation adjacent to the ends of the cable. Clamping is provided surrounding the second braided wire tubes at the ends thereof for holding the wire tubing in contact with the first and second return connectors. A flexible outer insulation layer surrounds the clamping means and the second reinforcing wrap.

DESCRIPTION OF THE PREFERRED EMBODIMENT

Figure 1:
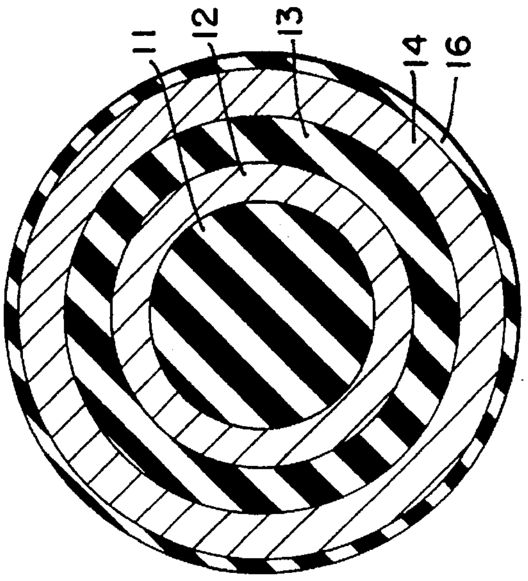
FIG 1 (PRIOR ART)
FIG. 1 is a cross section of an old art high current conducting coaxial cable.

Electrothermal chemical (ETC) guns require large amounts of energy to initiate firing. Such energy must be transferred to the gun in very short periods of time resulting in large electrical currents. It is not uncommon for such guns to require several hundred thousand amperes for firing. It is difficult to pass such large electrical currents through conductors connecting a pulse power supply to the gun without destroying the conductors. Destruction of conductors under these circumstances is due to the strong magnetic forces generated by the large electrical currents. Several conductor configurations have been used in the past to attempt to carry high current. Such conductor configurations were constructed to minimize the magnetic forces on the conductors. One such configuration is a parallel plate conductor plate configuration in which the conductors are plate-like and parallel to each other, separated by insulating material and carry the current in alternate directions. Another design used in the past is the coaxial configuration in which one conductor is placed inside another hollow conductor which is shaped in the form of a tube. The tubular or outer conductor is separated from the inner conductor by an insulating material which is wrapped around the inner conductor. The coaxial configuration has an advantage in that the magnetic field outside the outer conductor is 0. Thus, no magnetic forces are exerted on any metallic object in the immediate surroundings of the cable. While such a configuration provides a magnetic field free environment on the outside of the conductor cable, the space in between the two conductors experiences a very strong magnetic field. As a result, a force is exerted outwards on the outer conductor on every element of the outer conductor, wherein the force per unit area of the outer conductor is referred to as magnetic pressure. Such magnetic pressure is similar to the air pressure that is exerted against the inside surface of an inflated automobile tire. Thus, when a high current is passed through coaxial cable, the outer conductor experiences the same forces as are experienced by a tube filled with a high pressure fluid. As a result, the outer conductor in a coaxial cable may be literally "blown out" when the cable carries currents at levels of several hundred thousand amperes. Initially, the designers of such coaxial cables used copper tubes as the outer conductors in the coaxial cable. Such a configuration is useful as long as there is no relative movement between a system power supply and the portion of the system which must receive the high current pulse. However, when a large gun fires, it recoils up to two feet or more and therefore inflexible coaxial energy transfer lines cannot be used. One of the more recent coaxial line designs may be seen in FIG. 1 of the drawings wherein a central polyethylene rod 11 is surrounded by a tubular inner conductor 12. An insulation layer 13 surrounds the inner conductor 12 and a tubular outer conductor 14 is depicted surrounding the insulation layer. An outer insulation layer 16 is depicted surrounding the outer conductor. The cable of FIG. 1 has severe limitations inasmuch as current carrying capacity and cable flexibility are inadequate for most ETC gun applications. The large polyethylene core 11 limits minimum bend radius to greater than 32 inches and there is not sufficient mechanical confinement for the high magnetic pressures induced at high current levels to the conductors. Known coaxial cables of the type of FIG. 1 have been found to have current carrying capabilities less than 25 kiloamperes. Moreover, the coaxial cable design of FIG. 1 severely complicates the task of constructing end connectors for the current carrying inner and outer conducting tubes 12 and 14 respectively.

The present invention relates to the construction of a coaxial cable which is capable of carrying currents up to five hundred thousand amperes without suffering mechanical damage from the magnetic pressures resulting therefrom. Furthermore, the coaxial cable at the same time is sufficiently flexible so that it may be used in ETC gun firing applications.

Figure 2:
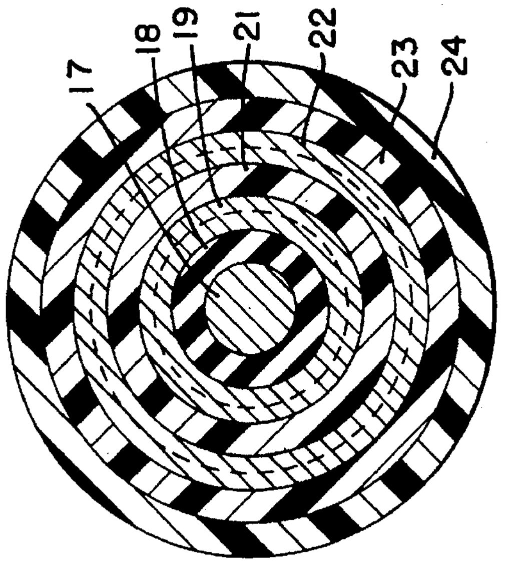
FIG. 2 is a cross section of the high energy flexible coaxial cable of the present invention.

With reference now to FIG. 2 of the drawings, it may be seen that an inner force/zero conductor 17 (4/0 wire size) is provided which is surrounded by high voltage insulation 18. A double layered braided wire tube 19 surrounds the insulation 18 and a high tensile strength tape 21 is wrapped around the double layered braided wire tube 19. An outer doubled layered braided wire tube 22 surrounds the high tensile strength reinforcing tape layer 21 and an outer high tensile strength reinforcing tape wrap 23 is applied around the outer braided wire tube. A shrink wrap tubing 24 is positioned around the layered construction just described. It should be noted that the section of the high energy flexible coaxial cable described in conjunction with FIG. 2 is taken through a portion of the cable removed from either end where end connectors are positioned on the cable and are hereinafter described.

Figure 3:
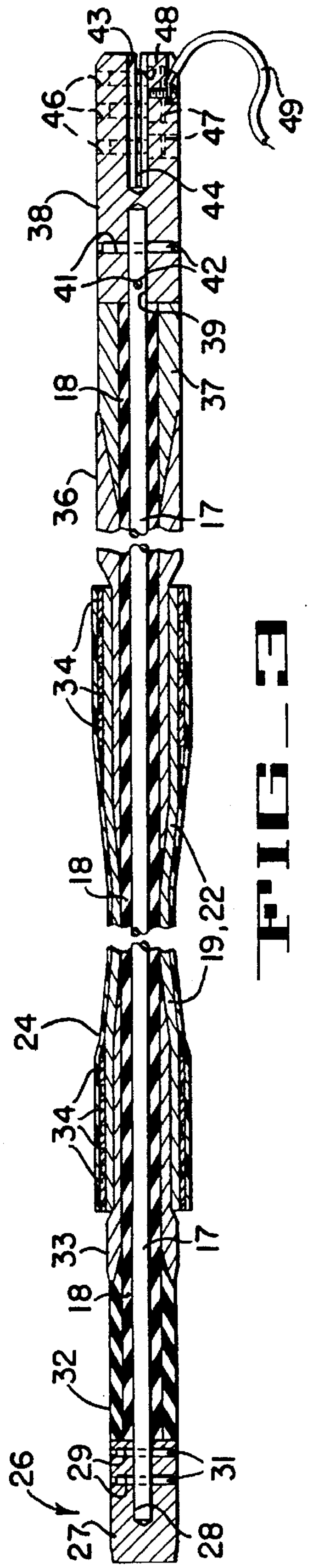
FIG. 3 is a section view along the length of the high energy flexible coaxial cable of the present invention.

In the drawing of FIG. 3 the high energy coaxial flexible cable of the present invention is shown with the center length portion of the cable broken away. The cable as used in ETC gun firing applications by the inventors to date have been up to 55 feet long. It should be recognized that longer or shorter cable length are included within the boundaries of this disclosure as long as the cable length is sufficient to afford the desired flexibility in the cable. Flexibility of the cable in this invention affords a minimum bend radius of about eleven and one half inches. At the left end of the cable shown in FIG. 3 is a power supply end connector shown generally at 26 on the coaxial cable of the present invention. An electrically conductive connector 27, of some material such as copper, is shown having a bore 28 therein for receiving the end of the center conductor 17. Two holes 29 are drilled along a diameter of the power supply end connector 27 and through the center conductor 17. A pin 31 is placed within each of the holes 29 and secured therein to firmly hold the power supply end connector on the end of the flexible coaxial cable described herein.

An insulator 32 is positioned around the insulation 18 for the center conductor 17 adjacent to the power supply end connector 27. A return conductor connector 33 is positioned surrounding the insulation 18 abutting the end of the insulator 32 and thereby being spaced from the power supply end connector 27. Return conductor connector 33 is provided made of some conductive material such as copper or aluminum. The inner and outer double layered braided wiring tubes 19 and 22 respectively, are placed in electrical contact with one another at the power supply end and are positioned surrounding a smaller diameter on the return conductor connector 33 as shown at the left end of FIG. 3. A series of magnetically shrunk clamps 34, four clamps in this embodiment, are shown surrounded by the outer heat shrink tubing insulation layer 24 to securely hold the tubular braided wire return connectors 19 and 22 in contact with each other and the return conductor connector 33. A magniflex machine manufactured by Maxwell Labs., San Diego, Calif. may be used to magnetically shrink or crimp the clamps 34. The clamps 34 are copper bands or may be any other electrically conductive bands to utilize the magnetic clamping feature. Alternatively, some type of hose clamp could be used to mechanically secure the double layered braided wire tubular return conductors 19 and 22 to the return conductor connector 33.

On the opposite or gun end of the high energy flexible coaxial cable the gun end return conductor connector 36 is shown surrounding the high voltage insulation 18 for the center conductor 17. The return conductor connector 36 like the supply end return conductor connector 33 is made of some electrically conductive material such as copper or aluminum. The connector 36 has a small diameter which fits beneath the double layered braided wire tubes 19 and 22 as shown in FIG. 3. The braided wire tubes 19 and 22 are joined together electrically in the area surrounding the smaller diameter of the return conductor connector 36 and are held firmly in place thereagainst by the magnetically shrunk clamps 34 or some other clamping device described hereinbefore. A gun end connector insulator 37 is shown disposed adjacent to the return conductor connector 36 and is positioned surrounding the high voltage insulation 18. Adjacent to the insulator 37 and spaced from the return conductor connector 36 is a gun end connector 38 which has a bore 39 in one end thereof. As in the power supply end connector 27, a pair of holes 41 are drilled through a diameter of the gun end connector 38 and a pin 42 is inserted in each of the holes 41 to fit tightly therein and secure the gun end of the high current conductor 17 within the gun end connector 38. An additional bore 43 is drilled into the gun end connector 38 at the end thereof opposite the end having the bore 39 therein. A slot 44 is cut across the diameter of the gun end connector 38 and a series of threaded holes 46 is placed parallel to but spaced from the diameter of the gun end connector to receive screws 47 extending through aligned clearance holes 48. As a result, a conductor similar to conductor 17 may be inserted in the bore 43 at the breech of a gun and clamped into the gun end connector 38 by advancing the screws 47 in the threads 46. An insulated wire voltage probe 49 is shown at the gun end connector for monitoring purposes.

As a result a high energy flexible coaxial cable is provided which is useful for providing high energy electrical pulses between a fixed power supply and a moving breech of an ETC gun, thereby solving the problem associated with delivering high energy pulses to gun systems which recoil or must be able to accommodate variable barrel elevations to accommodate various angles of fire. Current as high as 300 kiloamperes at 20 kilovolts has been transmitted through the disclosed coaxial cable and the design is deemed to be capable of carrying currents as high as 500 kiloamperes. The double layered tubular braided wire provides the cable flexibility while maintaining a current return flow path within the cable. The reinforcing tapes help contain high magnetic pressures associated with high currents and also provides for the flexibility of the coaxial cable and high voltage standoff capability. Kevlar (tm) tape is utilized in the reinforcing tape wraps 21 and 23 for currents above 250 kiloamperes and fiberglass wrapping tape has been used in the coaxial cable of the present invention for current levels below the 250 kiloampere level. The Kevlar wraps for the layers 21 and 23 of FIG. 2 provide greater strength for retaining the magnetic pressures experienced at the higher current levels while the fiberglass tape wraps for layers 21 and 23 appear to be sufficient for pressures due to currents below the 250 kiloampere level. In both instances the flexibility of the high energy coaxial cable disclosed herein is sufficient to obtain the 11½ inch bend radius mentioned hereinbefore.

Although the best mode contemplated for carrying out the present invention has been herein shown and described, it will be apparent that modification and variation may be made without departing from what is regarded to be the subject matter of the invention:

HMS:lu

What is claimed is:

1. A flexible high energy coaxial cable for conducting an electric current in the range of one kiloamp to five hundred kiloamps, comprising:

a high voltage conductor comprising a 4/0 copper wire:

a high voltage conductor insulation surrounding said conductor;

a first braided double layered wire tube providing a minimum bend radius of 11.5 inches surrounding said high voltage conductor insulation;

a first flexible reinforcing layer comprising aramid fiber tape wraps surrounding said first braided double layered wire tube;

a second braided double layered wire tube providing a minimum bend radius of 11.5 inches surrounding said first reinforcing layer;

a second flexible reinforcing layer comprising aramid fiber tape wraps surrounding said second braided double layered wire tube;

a flexible outer insulation layer surrounding said second flexible reinforcing layer;

a first end connector in electrical contact with said high voltage conductor at one end of the coaxial cable; and a second end connector in electrical contact with said high voltage conductor at the other end of the coaxial cable.

2. A flexible high energy coaxial cable as in claim 1 comprising first and second return connectors electrically isolated from said first and second end connectors and positioned at said one and other ends of the cable in electrical contact with said first and second braided double layered wire tubes, and a magnetically shrunk clamp surrounding said second braided double layered wire tube, thereby holding said first and second braided double layered wire tubes in electrical contact with said first and second return connectors.

3. The flexible high energy coaxial of claim 1 wherein said aramid fiber tape is a dielectric substance.

4. A high energy coaxial cable having a minimum bend radius of substantially eleven and one half inches, comprising:

a high voltage center conductor comprising a 4/0 copper wire for conducting current up to 500 Kiloamperes;

high voltage insulation surrounding said center conductor;

a first braided double layered wire tube surrounding said high voltage insulation;

a first reinforcing wrap surrounding said first braided double layered wire tube;

a second braided double layered wire tube surrounding said first reinforcing wrap and in electrical contact with said first braided double layered wire tube at the ends thereof;

a second reinforcing wrap comprising fiber glass tape surrounding said second braided double layered wire tube;

first and second end connectors attached to opposing ends of said high voltage center conductor;

first and second return connectors isolated from said first and second end connectors surrounding said high voltage insulation adjacent to the opposing ends thereof;

a magnetically shrunk clamping means surrounding said second braided double layered wire tube at the ends thereof for holding said wire tube in contact with said first and second return connectors; and a flexible outer insulation layer surrounding said magnetically shrunk clamping means and said second reinforcing wrap.

5. The flexible high energy coaxial cable of claim 4 wherein said first and said second reinforcing wraps include a dielectric substance which is aramid fiber.

* * * * *